(12) United States Patent
Sun et al.

(10) Patent No.: US 12,012,364 B2
(45) Date of Patent: Jun. 18, 2024

(54) LONG-TERM ABLATION-RESISTANT NITROGEN-CONTAINING CARBIDE ULTRA-HIGH TEMPERATURE CERAMIC WITH ULTRA-HIGH MELTING POINT AND APPLICATION THEREOF

(71) Applicant: CENTRAL SOUTH UNIVERSITY, Changsha (CN)

(72) Inventors: Wei Sun, Changsha (CN); Zheng Peng, Changsha (CN); Xiang Xiong, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 721 days.

(21) Appl. No.: 17/264,305

(22) PCT Filed: Jul. 10, 2020

(86) PCT No.: PCT/CN2020/101425
§ 371 (c)(1),
(2) Date: Jan. 29, 2021

(87) PCT Pub. No.: WO2021/103560
PCT Pub. Date: Jun. 3, 2021

(65) Prior Publication Data
US 2022/0009838 A1    Jan. 13, 2022

(30) Foreign Application Priority Data

Nov. 29, 2019    (CN) .......................... 201911204418.3

(51) Int. Cl.
C04B 35/56    (2006.01)
C04B 35/626    (2006.01)
C04B 35/645    (2006.01)

(52) U.S. Cl.
CPC ...... *C04B 35/5622* (2013.01); *C04B 35/6261* (2013.01); *C04B 35/6264* (2013.01);
(Continued)

(58) Field of Classification Search
CPC ................................................ C04B 35/58035
See application file for complete search history.

(56) References Cited

U.S. PATENT DOCUMENTS 6,447,896 B1    9/2002    Augustine

FOREIGN PATENT DOCUMENTS

CN    1248233 A    3/2000
CN    101582365 A    11/2009
(Continued)

OTHER PUBLICATIONS

Machine translation of CN 110845238. (Year: 2020).*
(Continued)

*Primary Examiner* — Vanessa T. Luk
*Assistant Examiner* — Cameron K Miller
(74) *Attorney, Agent, or Firm* — Bayramoglu Law Offices LLC (57) ABSTRACT

A long-term ablation-resistant nitrogen-containing carbide ultra-high temperature ceramic with an ultra-high melting point is prepared as follows: preparing the HfC powder and the HfN powder according to a mass ratio of HfC:HfN=(1-7):1; uniformly mixing the HfC powder and the HfN powder with the carbon powder and the carbon nitride powder to obtain a mixed powder, wherein the amount of the carbon powder and the amount of the carbon nitride powder do not exceed 8.0 wt. % and 5.0 wt. %, respectively, of the mixed powder mass; and performing spark plasma sintering on the mixed powder to produce the ceramic with the ultra-high melting point, a density ≥98%, and a uniform C/N content distribution. The ultra-high temperature ceramic is suitable (Continued)

for ultra-high temperature ablation-resistant protection at ≥3000° C. The ceramic maintains a close to zero ablation rate and a continuously stable oxidation-resistant protective structure after ablation for 300 s.

18 Claims, 4 Drawing Sheets

(52) U.S. Cl.
CPC .... *C04B 35/645* (2013.01); *C04B 2235/3839* (2013.01); *C04B 2235/3856* (2013.01); *C04B 2235/3886* (2013.01); *C04B 2235/422* (2013.01); *C04B 2235/5436* (2013.01); *C04B 2235/6562* (2013.01); *C04B 2235/6565* (2013.01); *C04B 2235/6567* (2013.01); *C04B 2235/666* (2013.01); *C04B 2235/77* (2013.01); *C04B 2235/9669* (2013.01)

(56) References Cited

FOREIGN PATENT DOCUMENTS

| CN | 105018927 | A | 11/2015 | |
|---|---|---|---|---|
| CN | 106800414 | A | 6/2017 | |
| CN | 110845238 | A | 2/2020 | |
| CN | 111285691 | A | 6/2020 | |
| WO | WO-2021133226 | A1 * | 7/2021 | ................ B22F 3/23 |

OTHER PUBLICATIONS

Alexey Zavjalov, et al., Synthesis of Hf—C—N ceramics by spark plasma sintering, EPJ Web of Conferences, 2019, pp. 1-4, 196, 00012.

Mingxuan Hu, et al., Test methods for ablation of ablators, National Standard GJB323A-96, 1996, National Defense Science, Technology and Industry Committee.

* cited by examiner

LONG-TERM ABLATION-RESISTANT NITROGEN-CONTAINING CARBIDE ULTRA-HIGH TEMPERATURE CERAMIC WITH ULTRA-HIGH MELTING POINT AND APPLICATION THEREOF

CROSS REFERENCE TO THE RELATED APPLICATIONS

This application is the national phase entry of International Application No. PCT/CN2020/101425, filed on Jul. 10, 2020, which is based upon and claims priority to Chinese Patent Application No. 201911204418.3, filed on Nov. 29, 2019, the entire contents of which are incorporated herein by reference.

TECHNICAL FIELD

The present invention relates to the technical field of carbide ceramics, and specifically, to a nitrogen-containing carbide ultra-high temperature ceramic block and an application thereof.

BACKGROUND

Ultra-high temperature ceramics have the advantages of ultra-high melting point, high strength at high temperature, good chemical stability, and the like, and are mainly used in extreme environments of ultra-high temperature. Common carbides, nitrides and borides of the fourth and fifth subgroups are typical representatives of ultra-high temperature ceramics. At present, hypersonic aircraft is the primary target application field of ultra-high temperature ceramics. When an aircraft flies in the air at a speed of 5 times or more of the speed of sound, the ultra-high temperature heat flow generated on its surface due to air resistance poses a severe challenge to the aircraft's thermal protection system. The heating rate and surface temperature of a nose cone cap, a leading edge and other parts of the aircraft are the highest. Therefore, high melting point performance is the primary selection criterion for aerodynamic control materials meeting the requirements of the nose cone cap and leading edge, and the oxidation-resistant and ablation-resistant properties of materials at high temperatures are necessary conditions to ensure the optimization of the aerodynamic performance of hypersonic aircraft.

At present, most of the structural materials or coatings under high temperature oxidation environments are mainly SiC. Because SiC can form a $SiO_2$-based protective layer with extremely low oxygen diffusion rate during oxidation, SiC has excellent oxidation resistance. However, the upper limit of the oxidation resistance temperature of silicon-based materials is about 1700° C. Once the upper limit is exceeded, the silicon-based materials will be actively oxidized to form gaseous SiO instead of an $SiO_2$ protective film, resulting in a sharp increase in the ablation rate on the material surface. Based on the intrinsic defect that the upper limit of oxidation resistance temperature of silicon-based materials is difficult to exceed 1700° C., there is an urgent need to develop novel materials with better temperature resistant tolerance to meet the development needs of a new generation of hypersonic aircraft. Therefore, hafnium-based and zirconium-based ultra-high temperature ceramics are developed to generate high-temperature ablation-resistant solid oxide films in high-temperature oxidation environments, in order to meet service requirements and break through the use temperature limits of silicon-based materials. Compared with zirconium-based materials, hafnium-based materials have better high-temperature stability and ablation resistance. Therefore, in order to develop a new generation of higher melting point long-term ablation-resistant ultra-high temperature ceramics, further optimizing the components of hafnium-based ultra-high temperature ceramics, better exerting the ultra-high temperature characteristics of hafnium-based ceramics, and increasing the temperature tolerance have become the key issue of the current research.

At present, the material with the highest melting point reported in public experiments is $Ta_4HfC_5$, which has a melting point of about 4200 K. Studies have found that the reason why $Ta_4HfC_5$ has an ultra-high melting point is that micro-doping of alloying elements can adjust the position of the Fermi level so that it is located at the energy valley. Generally speaking, an electronic state with lower energy than energy valley represents a bonding orbital, and an electronic state with higher energy represents an anti-bonding orbital. When the Fermi level is higher than the energy of the energy valley, it means that some antibonding orbitals at the Fermi level are occupied. Since the occupation of the anti-bonding orbital will weaken the strength of the chemical bond, if the anti-bonding orbital is vacated, the chemical bond can be strengthened and the hardness and melting point of the material can be improved. However, Axel van de Walle and others at Brown University in the United States performed quantum mechanical simulation on solids based on the first-principle calculations of density functional theory and found that the $HfC_xN_y$ system has a very high enthalpy of melting, and predicted that $HfC_xN_y$ is an ultra-high melting point substance. Some researchers have carried out related studies: such as preparation of $HfC_xN_y$ by the hot-pressing method. However, in terms of the preparation method, due to the strong covalent bond and low diffusivity, other researchers have discovered that when preparing the material by the hot-pressing method, it is difficult to obtain a dense sample as the nitrogen content increases, and there is a problem of uneven distribution of C/N content. The sample prepared by the present invention has a density of 99.8%, and is a uniform single-phase carbonitride solid solution.

SUMMARY

Technical Problems

In view of the shortcomings of the prior art, the present invention provides for the first time using ball milling+spark plasma sintering for preparing $HfC_xN_y$ ceramics with a density greater than or equal to 99.8% and a uniform C/N content distribution.

The novel ultra-high melting point ceramics designed and prepared by the present invention overcome the defects of the existing ultra-high temperature ablation-resistant ceramics that the ablation resistance temperature is too low or the high temperature ablation loss is too fast; and the novel ultra-high melting point ceramics are suitable for ultra-high temperature ablation-resistant protection at 3000° C. or above. Found by verification, the ceramics still maintain a state of close to zero ablation rate and a continuously stable oxidation-resistant protective structure after ablation for a super-long time (300 s).

Technical Solutions

The present invention provides a long-term ablation-resistant nitrogen-containing carbide ultra-high temperature ceramic with ultra-high melting point, prepared by the following steps:

step 1 preparing HfC powder and HfN powder according to a mass ratio of HfC:HfN=(1-7):1, preferably (1-3):1; mixing the prepared HfC powder and HfN powder with carbon powder and carbon nitride powder uniformly to obtain mixed powder, where the addition amount of the carbon powder does not exceed 8.0 wt. % of the mixed powder mass, and the addition amount of the carbon nitride powder does not exceed 5.0 wt. % of the mixed powder mass; and step 2 performing spark plasma sintering on the mixed powder obtained in step 1 to produce the long-term ablation-resistant nitrogen-containing carbide ultra-high temperature ceramic with ultra-high melting point, where the spark plasma sintering conditions are: the temperature in a sintering furnace is 1500-2400° C., the holding time is 5-60 minutes, the heating rate is 5-150° C./min, the cooling rate is 5-150° C./min, the pressure is 20-60 Mpa, and the vacuum degree is less than 5 Pa; and the preferred sintering conditions are: the temperature in the sintering furnace is 1900-2100° C., the holding time is 10-20 minutes, the heating rate is 100-120° C./min, the cooling rate is 100-120° C./min, the pressure is 30-50 Mpa, and the vacuum degree is less than 5 Pa.

The long-term ablation-resistant nitrogen-containing carbide ultra-high temperature ceramic with ultra-high melting point of the present invention is characterized in that, the HfC powder and the HfN powder in step 1 are nano-sized powders or micro-sized powders. As a preferred solution, the particle size of the HfC powder and the HfN powder is less than or equal to 10 microns. As a further preferred solution, the particle size of the HfC powder and the HfN powder is less than or equal to 3 microns. The particle size of the carbon powder is less than or equal to 10 microns, and the particle size of the carbon nitride is less than or equal to 10 microns. As a further preferred solution, the particle size of the carbon powder is less than or equal to 3 microns, and the particle size of the carbon nitride is less than or equal to 3 microns.

The long-term ablation-resistant nitrogen-containing carbide ultra-high temperature ceramic with ultra-high melting point of the present invention is characterized in that, the purity of the HfC powder and the HfN powder in step 1 is greater than or equal to 99.9%.

The long-term ablation-resistant nitrogen-containing carbide ultra-high temperature ceramic with ultra-high melting point of the present invention is characterized in that, in step 1. HfC powder and HfN powder are prepared according to a mass ratio of HfC:HfN=(1-3):1, and the prepared HfC powder and HfN powder are mixed with carbon powder and carbon nitride powder uniformly to obtain mixed powder, where the addition amount of the carbon powder is greater than 0 and does not exceed 8.0 wt. % of the mixed powder mass, and the addition amount of the carbon nitride powder is greater than 0 and does not exceed 5.0 wt. % of the mixed powder mass.

The long-term ablation-resistant nitrogen-containing carbide ultra-high temperature ceramic with ultra-high melting point of the present invention is characterized in that, raw material powders are mixed uniformly by wet ball milling. In the wet ball milling, the ball milling speed is controlled to be 200-400 r/min, the ball milling time is 12-24 h, and the mass ratio of ball milling medium to material is (3-10):1.

The long-term ablation-resistant nitrogen-containing carbide ultra-high temperature ceramic with ultra-high melting point of the present invention is characterized in that, in the wet ball milling, the ball milling medium used is organic, preferably ethanol. After the wet ball milling, drying is performed at 50-150° C. for 8-12 h in a vacuum atmosphere, then the material is screened with a 325-mesh sieve, and the screen underflow is taken as a spare material for plasma sintering. When used in industry, the spare material is sealed and stored under air-proof conditions.

The long-term ablation-resistant nitrogen-containing carbide ultra-high temperature ceramic with ultra-high melting point of the present invention is characterized in that, the density of the obtained product is greater than or equal to 98% and the C/N content distribution is uniform. Preferably, the density of the obtained product is greater than or equal to 99.5% and the C/N content distribution is uniform.

Preferably, the purity of the carbon powder and the carbon nitride powder in the present invention is 99% by mass percentage.

The long-term ablation-resistant nitrogen-containing carbide ultra-high temperature ceramic with ultra-high melting point of the present invention is characterized in that, after ablation for 300 s in an oxyacetylene flame environment at 3000° C., the mass ablation rate is $8 \times 10^{-3}$-$9 \times 10^{-1}$ mg/s, and the linear ablation rate is $1 \times 10^{-5}$ mm/s-$3 \times 10^{-3}$ mm/s.

The long-term ablation-resistant nitrogen-containing carbide ultra-high temperature ceramic with ultra-high melting point of the present invention is characterized in that, when a product is prepared by mixing HfC and HfN powder according to the mass ratio of HfC and HfN powder of 3:1, the mass ablation rate and the linear ablation rate after ablation for 300 s in an oxyacetylene flame environment at 3000° C. are $8 \times 10^{-3}$ mg/s and $1 \times 10^{-5}$ mm/s, respectively. Such effect greatly exceeded expectations at the time.

The present invention provides an application of the long-term ablation-resistant nitrogen-containing carbide ultra-high temperature ceramic with ultra-high melting point, including applying same to ultra-high temperature ablation-resistant protection at 3000° C. or above.

Beneficial Effects

Compared with the prior art, the advantages and positive effects of the present invention are embodied in:
(1) the preparation process flow is simple and easy to implement, and the preparation cycle is short;
(2) the enthalpy of melting of the prepared ceramic is ultra-high, the bond strength is ultra-high, and the melting point is extremely high;
(3) the prepared ceramic has superior ablation-resistant performance; through the selection of appropriate amount and proper proportion of HfC and HfN combined with spark plasma sintering, the obtained sample still maintains a state of almost zero ablation rate after ablation at 3000° C. for 300 s, and there is no apparent ablation pit in the central ablation zone;
(4) the prepared sample has good mechanical properties; the combination of appropriate amount of HfC and HfN improves the intrinsic defect of low fracture toughness of carbide, and greatly improves the bending strength and fracture toughness of the ceramic.

DETAILED DESCRIPTION OF THE EMBODIMENTS

Example 1

HfC and HfN powders in a mass ratio of 3:2, carbon powder with an addition amount of 5% of the total mass of the powder, and carbon nitride with an addition amount of 5% of the total mass of the powder were ball milled on a planetary ball mill for 15 h, where the powders had a particle size of 1 μm and a purity of greater than 99.9%, the ball milling medium was ethanol solution, the rotation speed was 200 r/min, and the mass ratio of ball milling medium to material was 8:1. Then the powder was dried in a drying oven at 80° C. for 10 hours and sieved to obtain a mixed powder.

Figure 1:
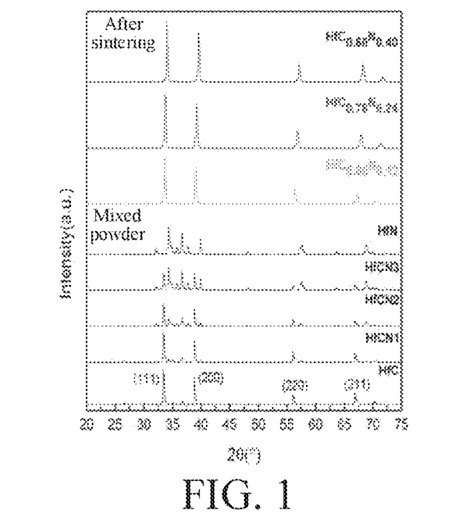
FIG. 1 presents an X-ray diffraction pattern of the $HfC_xN_y$ ceramic surfaces in Examples 1, 2 and 3.
Figure 2:
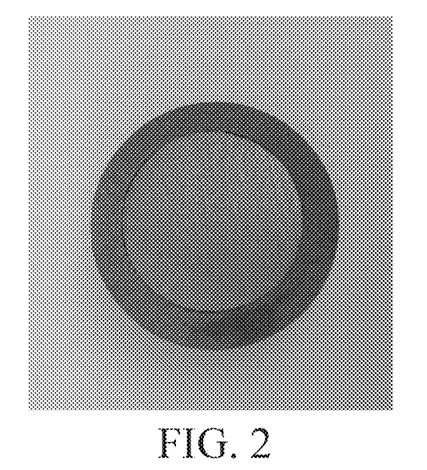
FIG. 2 presents a macro morphology of the surface of the $HfC_{0.76}N_{0.24}$ solid solution in Example 2.
Figure 3:
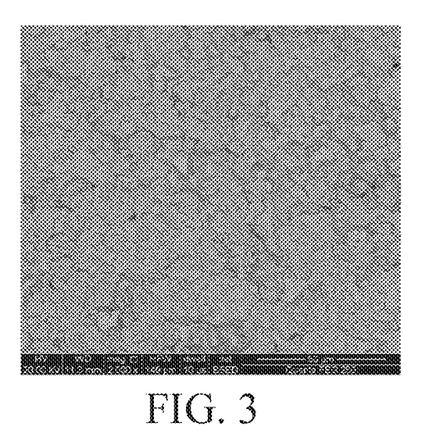
FIG. 3 presents a micro morphology of the surface of the $HfC_{0.76}N_{0.24}$ solid solution in Example 2. It can be seen that the sample is dense without apparent holes, and the phase composition is uniform.
Figure 4:
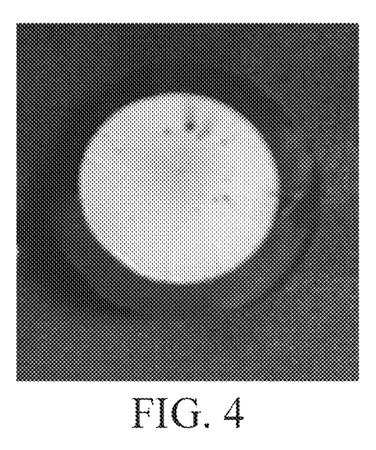
FIG. 4 presents a macro ablation morphology of the $HfC_{0.76}N_{0.24}$ sample in Example 2 after ablation with an oxyacetylene flame at 3000° C. for 300 s. No apparent ablation pits are seen after long-term ablation at ultra-high temperature, which proves that the $HfC_{0.76}N_{0.24}$ sample has excellent ablation resistance.
Figure 5:
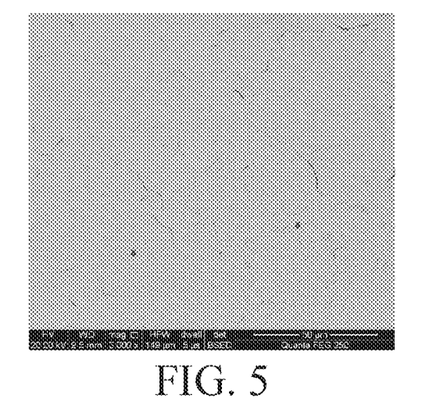
FIG. 5 presents a surface microstructure in the central area of the $HfC_{0.76}N_{0.24}$ sample in Example 2 after ablation.
Figure 6:
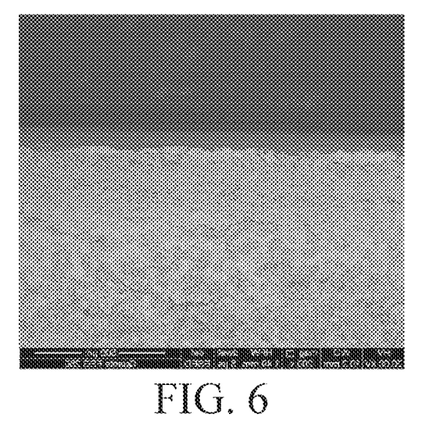
FIG. 6 presents a cross-sectional microstructure in the central area of the $HfC_{0.76}N_{0.24}$ sample in Example 2 after ablation.

The mixed powder was placed in a graphite mold for performing spark plasma sintering. The vacuum degree in the furnace was less than 5 Pa. The temperature was raised to 2100° C. at a heating rate of 100° C./min and kept for 15 minutes, and the pressure was 45 Mpa. Then the temperature was decreased to room temperature at a cooling rate of 100° C./min. The sintered ceramic block was characterized by an electron probe and showed that the atomic ratio of C to N was 0.60:0.40, and a homogeneous $HfC_{0.60}N_{0.40}$ solid solution (with a density of 99.8%) was obtained. Ablation test was performed with reference to the ablation experimental equipment described in the National Standard GJB323A-96. After ablation for 300 s in an oxyacetylene flame environment at 3000° C., the mass ablation rate was $9\times10^{-1}$ mg/s, and the linear ablation rate was $3\times10^{-3}$ mm/s.

Example 2

HfC and HfN powders in a mass ratio of 3:1, carbon powder with an addition amount of 4% of the total mass of the powder, and carbon nitride with an addition amount of 6% of the total mass of the powder were ball milled on a planetary ball mill for 20 h, where the powders had a particle size of 1 μm and a purity of greater than 99.9%, the ball milling medium was ethanol solution, the rotation speed was 200 r/min, and the mass ratio of ball milling medium to material was 8:1. Then the powder was dried in a drying oven at 50° C. for 10 hours and sieved to obtain a mixed powder.

The mixed powder was placed in a graphite mold for performing spark plasma sintering. The vacuum degree in the furnace was less than 5 Pa. The temperature was raised to 2000° C., at a heating rate of 100° C./min and kept for 10 minutes, and the pressure was 40 Mpa. Then the temperature was decreased to room temperature at a cooling rate of 100° C./min, and a high-purity single-phase face-centered cubic structured ceramic was obtained. The sintered ceramic block was characterized by an electron probe and showed that the atomic ratio of C to N was 0.76:0.24, and a $HfC_{0.76}N_{0.24}$ solid solution (with a density of 99.6%) was formed. Ablation test was performed with reference to the ablation experimental equipment described in the National Standard GJB323A-96. After ablation for 300 s in an oxyacetylene flame environment at 3000° C., the mass ablation rate and the linear ablation rate were only $8\times10^{-3}$ mg/s and $1\times10^{-5}$ mm/s.

Example 3

HfC and HfN powders in a mass ratio of 7:1, carbon powder with an addition amount of 5% of the total mass of the powder, and carbon nitride with an addition amount of 5% of the total mass of the powder were ball milled on a planetary ball mill for 20 h, where the powders had a particle size of 1 μm and a purity of greater than 99.9%, the ball milling medium was ethanol solution, the rotation speed was 200 r/min, and the mass ratio of ball milling medium to material was 8:1. Then the powder was dried in a drying oven at 70° C. for 10 hours and sieved to obtain a mixed powder.

The mixed powder was placed in a graphite mold for performing spark plasma sintering. The vacuum degree in the furnace was less than 5 Pa. The temperature was raised to 2000° C. at a heating rate of 100° C./min and kept for 10 minutes, and the pressure was 45 Mpa. Then the temperature was decreased to room temperature at a cooling rate of 100° C./min, and a high-purity single-phase face-centered cubic structured ceramic was obtained. The sintered ceramic block was characterized by an electron probe and showed that the atomic ratio of C to N was 0.88:0.12, and a $HfC_{0.83}N_{0.12}$ solid solution (with a density of 98%) was formed. Ablation test was performed with reference to the ablation experimental equipment described in the National Standard GJB323A-96. After ablation for 300 s in an oxyacetylene flame environment at 3000° C., the mass ablation rate was $6\times10^{-1}$ mg/s, and the linear ablation rate was $2\times10^{-3}$ mm/s.

Example 4

HfC and HfN powders in a mass ratio of 4:1, carbon powder with an addition amount of 6% of the total mass of the powder, and carbon nitride with an addition amount of 5% of the total mass of the powder were ball milled on a planetary ball mill for 17 h, where the powders had a particle size of 1 μm and a purity of greater than 99.9%, the ball milling medium was ethanol solution, the rotation speed was 200 r/min, and the mass ratio of ball milling medium to material was 8:1. Then the powder was dried in a drying oven at 70° C. for 10 hours and sieved to obtain a mixed powder.

The mixed powder was placed in a graphite mold for performing spark plasma sintering. The vacuum degree in the furnace was less than 5 Pa. The temperature was raised to 2100° C., at a heating rate of 100° C./min and kept for 10 minutes, and the pressure was 45 Mpa. Then the temperature was decreased to room temperature at a cooling rate of 100° C./min, and a high-purity single-phase face-centered cubic structured ceramic was obtained. Ablation test was performed with reference to the ablation experimental equipment described in the National Standard GJB323A-96. After ablation for 300 s in an oxyacetylene flame environment at 3000° C., the mass ablation rate was $7 \times 10^{-1}$ mg/s, and the linear ablation rate was $4 \times 10^{-3}$ mm/s.

Example 5

HfC and HfN powders in a mass ratio of 5:2, carbon powder with an addition amount of 4% of the total mass of the powder, and carbon nitride with an addition amount of 5% of the total mass of the powder were ball milled on a planetary ball mill for 16 h, where the powders had a particle size of 1 µm and a purity of greater than 99.9%, the ball milling medium was ethanol solution, the rotation speed was 200 r/min, and the mass ratio of ball milling medium to material was 8:1. Then the powder was dried in a drying oven at 70° C. for 10 hours and sieved to obtain a mixed powder.

The mixed powder was placed in a graphite mold for performing spark plasma sintering. The vacuum degree in the furnace was less than 5 Pa. The temperature was raised to 2100° C. at a heating rate of 100° C./min and kept for 10 minutes, and the pressure was 45 Mpa. Then the temperature was decreased to room temperature at a cooling rate of 100° C./min, and a high-purity ceramic (with a density of 99.5%) was obtained. Ablation test was performed with reference to the ablation experimental equipment described in the National Standard. GJB323A-96. After ablation for 300 s in an oxyacetylene flame environment at 3000° C., the mass ablation rate was $9 \times 10^2$ mg/s, and the linear ablation rate was $9 \times 10^{-4}$ mm/s.

Comparative Example 1

HfC powder was ball milled on a planetary ball mill for 20 h, where the powders had a particle size of 1 µm and a purity of greater than 99.9%, the ball milling medium was ethanol solution, the rotation speed was 200 r/min, and the mass ratio of ball milling medium to material was 8:1. Then the powder was dried in a drying oven at 60° C. for 10 hours and sieved to obtain a mixed powder.

Figure 7:
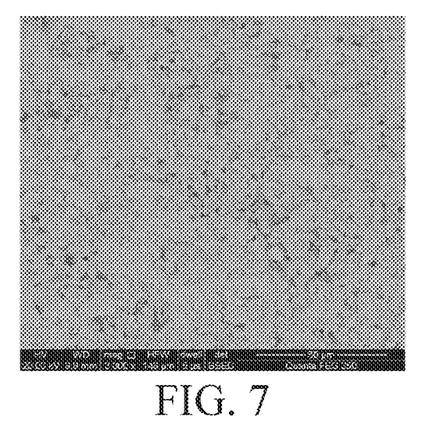
FIG. 7 presents a surface micro morphology of HfC in Comparative Example 1. It can be seen that the sample has apparent holes.
Figure 8:
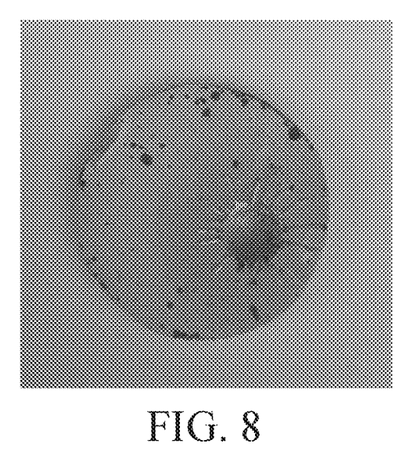
FIG. 8 presents a macro ablation morphology of HfC ceramics in Comparative Example 1 after ablation with an oxyacetylene flame at 3000° C. for 60 s. There are apparent ablation pits in the ablation central area.

The mixed powder was placed in a graphite mold for performing spark plasma sintering. The vacuum degree in the furnace was less than 5 Pa. The temperature was raised to 2000° C. at a heating rate of 100° C./min and kept for 10 minutes, and the pressure was 40 Mpa. Then the temperature was decreased to room temperature at a cooling rate of 100° C./min, and a HfC ceramic (with a density of 90%) was obtained. The HfC ceramic without nitrogen doped had apparent ablation pits after ablation for 60 s in an oxyacetylene flame environment at 3000° C., After ablation for 60 s in the oxyacetylene flame environment at 3000° C., the mass ablation rate was 9 mg/s and the linear ablation rate was $5 \times 10^{-2}$ mm/s. The ablation resistance was not as good as the novel nitrogen-doped carbide ultra-high temperature ceramics in the embodiments.

Comparative Example 2

HfC and HfN powders in a mass ratio of 10:1 were ball milled on a planetary ball mill for 18 h, where the powders had a particle size of 1 µm and a purity of greater than 99.9%, the ball milling medium was ethanol solution, the rotation speed was 200 r/min, and the mass ratio of ball milling medium to material was 7:1. Then the powder was dried in a drying oven at 60° C. for 10 hours and sieved to obtain a mixed powder.

The mixed powder was placed in a graphite mold for performing spark plasma sintering. The vacuum degree in the furnace was less than 5 Pa. The temperature was raised to 2100° C. at a heating rate of 100° C./min and kept for 10 minutes, and the pressure was 40 Mpa. Then the temperature was decreased to room temperature at a cooling rate of 100° C./min. After the ceramic sample was subjected to ablation for 60 s in an oxyacetylene flame environment at 3000° C., the mass ablation rate was 8.7 mg/s, and the linear ablation rate was $4 \times 10^{-2}$ mm/s.

Comparative Example 3

HfN powder was ball milled on a planetary ball mill for 18 h, where the powders had a particle size of 1 µm and a purity of greater than 99.9%, the ball milling medium was ethanol solution, the rotation speed was 200 r/min, and the mass ratio of ball milling medium to material was 7:1. Then the powder was dried in a drying oven at 60° C. for 10 hours and sieved to obtain a mixed powder.

The mixed powder was placed in a graphite mold for performing spark plasma sintering. The vacuum degree in the furnace was less than 5 Pa. The temperature was raised to 2100° C. at a heating rate of 100° C./min and kept for 10 minutes, and the pressure was 40 Mpa. Then the temperature was decreased to room temperature at a cooling rate of 100° C./min. After the HfN ceramic sample was subjected to ablation for 60 s in an oxyacetylene flame environment at 3000° C., the mass ablation rate was 9.5 mg/s, and the linear ablation rate was $6 \times 10^{-2}$ mm/s.

What is claimed is:

1. A long-term ablation-resistant nitrogen-containing carbide ceramic, wherein a density of the long-term ablation-resistant nitrogen-containing carbide ceramic is greater than or equal to 99.8%, and a C/N content distribution is uniform, and wherein the long-term ablation-resistant nitrogen-containing carbide ceramic is prepared by the following steps:

step 1:
preparing a HfC powder and a HfN powder according to a mass ratio of HfC:HfN=(1-7):1, uniformly mixing the HfC powder and the HfN powder with a carbon powder and a carbon nitride powder to obtain a mixed powder, wherein an amount of the carbon powder is greater than 0 wt. % and does not exceed 8.0 wt. % of a mass of the mixed powder, and an amount of the carbon nitride powder is greater than 0 wt. % and does not exceed 5.0 wt. % of the mass of the mixed powder; and step 2:
performing a spark plasma sintering on the mixed powder obtained in step 1 to produce the long-term ablation-resistant nitrogen-containing carbide ceramic, wherein conditions of the spark plasma sintering re: a temperature in a sintering furnace is 1500-2400° C., a holding time is 5-60 minutes, a heating rate is 5-150° C./min, a cooling rate is 5-150° C./min, a pressure is 20-60 Mpa, and a vacuum degree is less than 5 Pa.

2. The long-term ablation-resistant nitrogen-containing carbide ceramic of claim 1, wherein in step 1, the HfC powder and the HfN powder are prepared according to a mass ratio of HfC:HfN=(1-3):1; the HfC powder and the HfN powder are mixed with the carbon powder and the carbon nitride powder uniformly to obtain the mixed powder, wherein the amount of the carbon powder is greater than 0 and does not exceed 8.0 wt. % of the mass of the mixed powder, and the amount of the carbon nitride powder is greater than 0 and does not exceed 5.0 wt. % of the mass of the mixed powder.

3. The long-term ablation-resistant nitrogen-containing carbide ceramic of claim 1, wherein the HfC powder and the HfN powder in step 1 are nano-sized powders or micro-sized powders; wherein a particle size of the HfC powder and the HfN powder is less than or equal to 10 microns, a particle size of the carbon powder is less than or equal to 10 microns, and a particle size of the carbon nitride powder is less than or equal to 10 microns.

4. The long-term ablation-resistant nitrogen-containing carbide ceramic of claim 1, wherein a purity of the HfC powder and the HfN powder in step 1 is greater than or equal to 99.9%.

5. The long-term ablation-resistant nitrogen-containing carbide ceramic of claim 1, wherein raw material powders consisting of the HfC powder, the HfN powder, the carbon powder, and the carbon nitride powder are uniformly mixed by a wet ball milling; and in the wet ball milling, a ball milling speed is controlled to be 200-400 r/min, a ball milling time is 12-24 h, and a mass ratio of a ball milling medium to the raw material powders is (3-10):1.

6. The long-term ablation-resistant nitrogen-containing carbide ceramic of claim 5, wherein in the wet ball milling, the ball milling medium used is organic, and the ball milling medium is ethanol; and after the wet ball milling, drying is performed at 50-150° C. for 8-12 h in a vacuum atmosphere, then the mixed powder is screened with a 325-mesh sieve, and a screen underflow is taken as a spare material for the spark plasma sintering.

7. The long-term ablation-resistant nitrogen-containing carbide ceramic of claim 1, wherein after an ablation is performed on the long-term ablation-resistant nitrogen-containing carbide ceramic for 300 s in an oxyacetylene flame environment at 3000° C., a mass ablation rate is $8 \times 10^{-3}$-$9 \times 10^{-1}$ mg/s, and a linear ablation rate is $1 \times 10^{-5}$ mm/s-$3 \times 10^{-3}$ mm/s.

8. The long-term ablation-resistant nitrogen-containing carbide ceramic of claim 2, wherein in step 1, when the HfC powder and the HfN powder are prepared according to the mass ratio of HfC:HfN=3:1, a mass ablation rate and a linear ablation rate of the long-term ablation-resistant nitrogen-containing carbide ceramic after an ablation for 300 s in an oxyacetylene flame environment at 3000° C. are $8 \times 10^{-3}$ mg/s and $1 \times 10^{-5}$ mm/s, respectively.

9. The long-term ablation-resistant nitrogen-containing carbide ceramic of claim 1, wherein the long-term ablation-resistant nitrogen-containing carbide ceramic is ablation resistant at 3000° C. or above.

10. The long-term ablation-resistant nitrogen-containing carbide ceramic of claim 2, wherein after an ablation is performed on the long-term ablation-resistant nitrogen-containing carbide ceramic for 300 s in an oxyacetylene flame environment at 3000° C., a mass ablation rate is $8 \times 10^{-3}$-$9 \times 10^{-1}$ mg/s, and a linear ablation rate is $1 \times 10^{-5}$ mm/s-$3 \times 10^{-3}$ mm/s.

11. The long-term ablation-resistant nitrogen-containing carbide ceramic of claim 3, wherein after an ablation is performed on the long-term ablation-resistant nitrogen-containing carbide ceramic for 300 s in an oxyacetylene flame environment at 3000° C., a mass ablation rate is $8 \times 10^{-3}$-$9 \times 10^{-1}$ mg/s, and a linear ablation rate is $1 \times 10^{-5}$ mm/s-$3 \times 10^{-3}$ mm/s.

12. The long-term ablation-resistant nitrogen-containing carbide ceramic of claim 4, wherein after an ablation is performed on the long-term ablation-resistant nitrogen-containing carbide ceramic for 300 s in an oxyacetylene flame environment at 3000° C., a mass ablation rate is $8 \times 10^{-3}$-$9 \times 10^{-1}$ mg/s, and a linear ablation rate is $1 \times 10^{-5}$ mm/s-$3 \times 10^{-3}$ mm/s.

13. The long-term ablation-resistant nitrogen-containing carbide ceramic of claim 5, wherein after an ablation is performed on the long-term ablation-resistant nitrogen-containing carbide ceramic for 300 s in an oxyacetylene flame environment at 3000° C., a mass ablation rate is $8 \times 10^{-3}$-$9 \times 10^{-1}$ mg/s, and a linear ablation rate is $1 \times 10^{-5}$ mm/s-$3 \times 10^{-3}$ mm/s.

14. The long-term ablation-resistant nitrogen-containing carbide ceramic of claim 6, wherein after an ablation is performed on the long-term ablation-resistant nitrogen-containing carbide ceramic for 300 s in an oxyacetylene flame environment at 3000° C., a mass ablation rate is $8 \times 10^{-3}$-$9 \times 10^{-1}$ mg/s, and a linear ablation rate is $1 \times 10^{-5}$ mm/s-$3 \times 10^{-3}$ mm/s.

15. The long-term ablation-resistant nitrogen-containing carbide ceramic according to claim 10, wherein in step 1, the HfC powder and the HfN powder are prepared according to a mass ratio of HfC:HfN=(1-3):1; the HfC powder and the HfN powder are mixed with the carbon powder and the carbon nitride powder uniformly to obtain the mixed powder, wherein the amount of the carbon powder is greater than 0 and does not exceed 8.0 wt. % of the mass of the mixed powder, and the amount of the carbon nitride powder is greater than 0 and does not exceed 5.0 wt. % of the mass of the mixed powder.

16. The long-term ablation-resistant nitrogen-containing carbide ceramic according to claim 10, wherein the HfC powder and the HfN powder in step 1 are nano-sized powders or micro-sized powders; wherein a particle size of the HfC powder and the HfN powder is less than or equal to 10 microns, a particle size of the carbon powder is less than or equal to 10 microns, and a particle size of the carbon nitride powder is less than or equal to 10 microns.

17. The long-term ablation-resistant nitrogen-containing carbide ceramic according to claim 10, wherein a purity of the HfC powder and the HfN powder in step 1 is greater than or equal to 99.9%.

18. The long-term ablation-resistant nitrogen-containing carbide ceramic according to claim 10, wherein raw material powders consisting of the HfC powder, the HfN powder, the carbon powder, and the carbon nitride powder are uniformingly mixed by a wet ball milling; and in the wet ball milling, a ball milling speed is controlled to be 200-400 r/min, a ball milling time is 12-24 h, and a mass ratio of a ball milling medium to the raw material powders is (3-10):1.

* * * * *